United States Patent [19]

Templeton

[11] 4,252,308
[45] Feb. 24, 1981

[54] AUGER JOGGER ASSEMBLY

[75] Inventor: William B. Templeton, Howell, Mich.

[73] Assignee: Burroughs Corporation, Detroit, Mich.

[21] Appl. No.: 34,904

[22] Filed: May 1, 1979

[51] Int. Cl.³ ............................................ B65H 29/42
[52] U.S. Cl. ..................................... 271/179; 271/221
[58] Field of Search ............... 271/179, 178, 221, 222; 198/788

[56] References Cited

U.S. PATENT DOCUMENTS

| 1,743,223 | 1/1930 | Lowy | 198/788 |
| 1,868,825 | 7/1932 | Grosjean | 198/788 |
| 3,078,089 | 2/1963 | Maidment | 271/179 |
| 3,628,788 | 12/1971 | Simmons | 271/179 X |
| 3,995,851 | 12/1976 | Casper | 271/179 |

Primary Examiner—Richard A. Schacher

Attorney, Agent, or Firm—Charles E. Quarton; Kevin R. Peterson

[57] ABSTRACT

An auger jogger assembly for a high speed item sorter pocket receptacle wherein a fixed shaft carries the armature of an electric drive eddy current motor. The fixed nonmagnetic reluctance member of which is a thin cylindrical metallic sleeve-like member press fitted into the cylindrical opening of a rotatable cylinder which carries about its periphery two volute or helical augers of differing diameters and spacings. The drive shaft and armature of the motor are fixed against rotation while the cylindrical reluctance member is secured within and rotatable with the rotatable cylinder. Energization of the motor armature causes the external cylinder to rotate effective to move item/documents into the pocket receptacle while vibrating the document sufficiently so as to reduce receptacle floor friction and force the items into a closely stacked bunch or pack.

8 Claims, 9 Drawing Figures

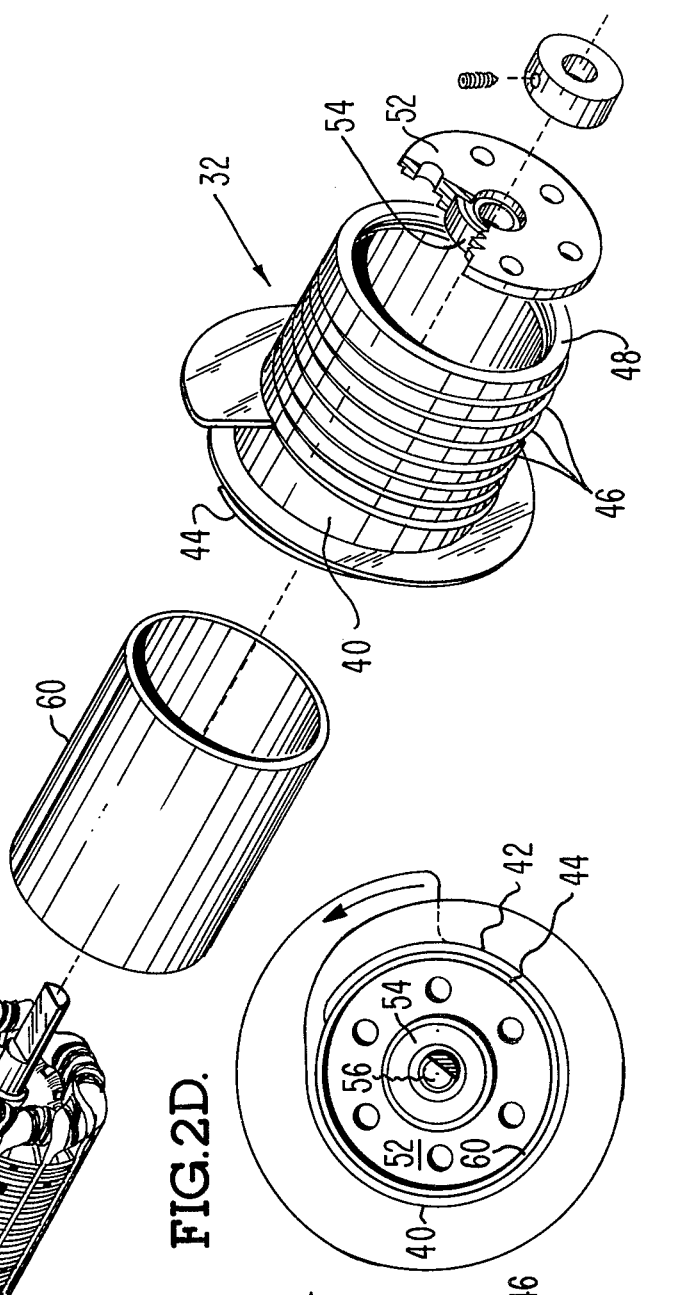
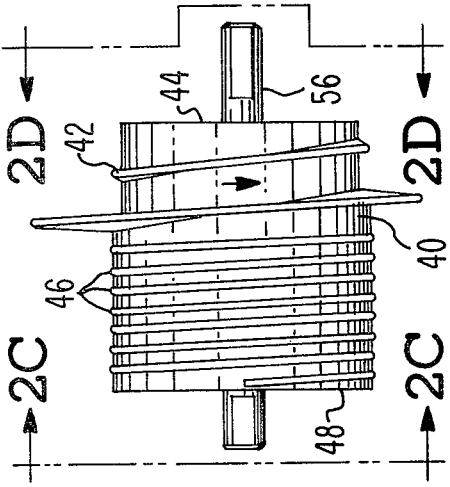
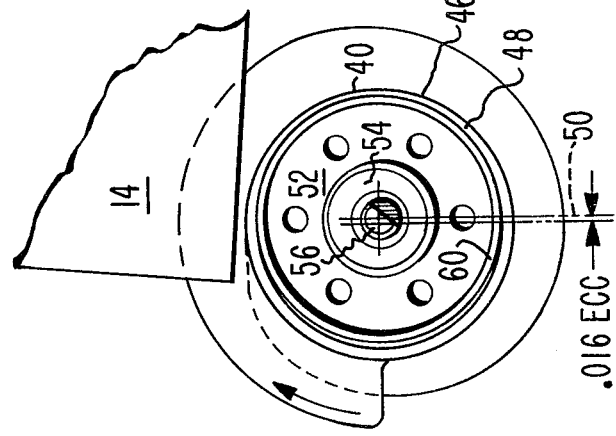
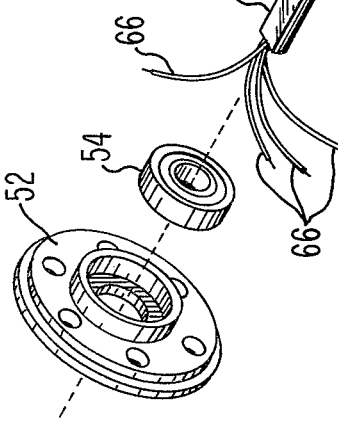
FIG.2. FIG.2A. FIG.2B. FIG.2C. FIG.2D.

AUGER JOGGER ASSEMBLY

BACKGROUND OF THE INVENTION

1. Field of the Invention

This invention relates broadly to item/document pocket receptacles for high speed sorter stackers and to means in such receptacles for stacking items at high speed close together without inter item interference.

2. Description of the Prior Art

Many different types of stacker apparatus have been utilized to stack items in receptacle pockets of high speed sorters with varying degrees of success and and-/or effectiveness. Forced air, vacuum, electrostatic deflection, etc., have been tried but no single arrangement to date is completely effective or satisfactory with all types of items.

Some of the better known examples are effective with thick heavy paper items but are more or less insensitive to those items which are relatively thin or flimsy in cross section. Other types of item handling apparatus work well for thin items but have encountered difficulties with punch card weight stock.

The present apparatus avoids the problem associated with the earlier stacker pocket apparatus while providing a cheaper, more efficient, easier to handle, easily replaceable piece of hardware which aids in stacking all types of items regardless of weight and/or size or cross sectional area and at the same time vibrates the item slightly but sufficiently to overcome the frictional drag imposed on the item by the floor of the receptacle into which the items are stacked.

SUMMARY OF THE INVENTION

An auger jogger assembly for high speed sorter pocket receptacles wherein a unitary cylindrical dielectric member is provided with a large and a small auger helix integral therewith and wherein the small auger helix is eccentric relative to the axis of rotation of the cylindrical member while the lands of the larger auger helix are sufficiently elevated from the root diameter to entrap and move the larger, heavier type item/documents. An eddy current type miniature electric drive motor is disposed within the cylindrical member with the armature thereof secured to the supporting shaft of the motor which is fixed against rotation while the reluctance member in the form of a hollow conductive nonmagnetic cylinder is secured to the inner periphery of the cylindrical member effective upon energization of the armature of the motor to cause the auger cylinder to rotate engaging and moving items while simultaneously vibrating such items due to the eccentricity of the auger helix effective to form a closely stacked group of items.

BRIEF DESCRIPTION OF THE DRAWING

FIG. 2 is an exploded isometric view of the drive and helical auger of the present invention;

FIG. 2A is a side view of the helical auger of the present invention illustrating the two different size helicies and their relationship to one another;

FIG. 2B is a side view of the helical auger of the present invention rotated 90 degrees to illustrate the eccentricity of the smaller of the two helicies;

FIG. 2C is a view along the line 2C—2C of FIG. 2A;

FIG. 2D is a view along the line 2D—2D of FIG. 2A;

DETAILED DESCRIPTION OF THE PREFERRED EMBODIMENT

The problems associated with the high speed sorting and stacking of paper items or documents have been and varied. Some of these problems relate to the aerodynamics associated with the high speed movement of flimsy paper material such for example as checks. Other problems have to do mainly with obtaining the desired high speed utilizing known hardware and hardware configurations. Additionally, problems present themselves in the area of the item stacker or pocket receptacle, the area to which the present invention addresses itself.

In order to save space as well as shorten the length of the overall item sorting-stacking pathway the present invention utilizes a novel development characterized as a front and back stacker. For a detailed description of this apparatus reference may be had to copending U.S. application Ser. No. 25,913 filed Apr. 2, 1979 entitled "Front and Back Stacker for High Speed Sorter/Reader Apparatus" in the name of William B. Templeton, assigned to the same assignee as the present invention.

In the front and back stacker as described in the referenced application items are fed along a straight line path from an input receptacle 10 to and through associated modular item handling assemblies to a stacker module 12. At the stacker module 12, based on a previously derived address code, the decision is made to forward the items 14 (FIG. 2C) to a front or a back pocket receptacle 16 or 18 respectively (or straight through to the next pair of pockets).

Figure 1:
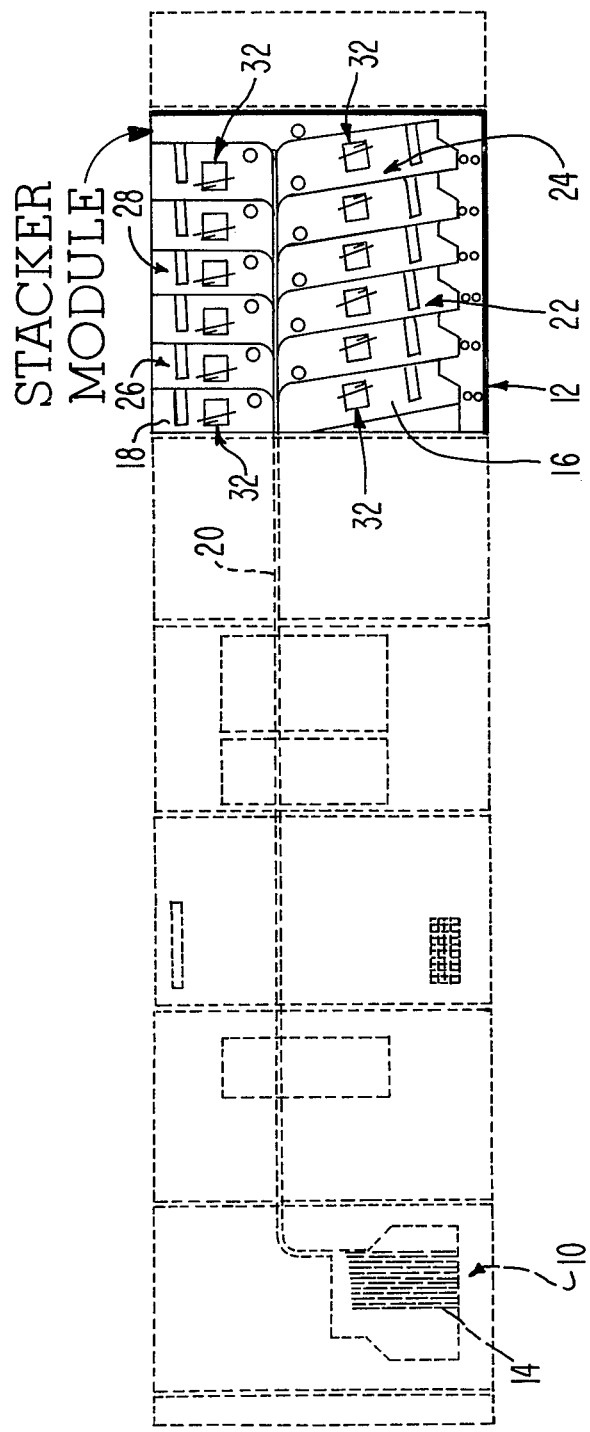
FIG. 1 is a top plan view of a high speed item sorter stacker showing the stacker modules incorporating the present invention.

Reference to FIG. 1 indicates that each item 14 is required to turn "inflight" out of the straight line path of movement 20 to the right or the left as viewed from above, at right angles to this path with respect to the back stacker pocket 18 and at an obtuse angle with respect to the front stacker pocket 16. At the speed at which items are shunted into the respective pockets, it is necessary to provide means for assuring that entering items do not crash into items already at rest within a pocket or interfere with those items proceeding directly in front of the incoming items. To this end, means is provided to move each entering item path. Additionally, since the receptacle floor creates a certain amount of undesirable frictional drag on each item which tends to prevent rapid movement of the item within the pocket receptacle, means is provided to vibrate or jog the items entering the pocket receptacle effectively eliminating the drag as well as forcing the items to neatly stack or bunch together within the assigned pocket.

As illustrated in FIG. 1, stacker module employs twelve pocket receptacles, however, it is to be understood that a greater or a lesser number of pockets can be provided depending upon the individual requirements of the machine user.

Figure 3A:
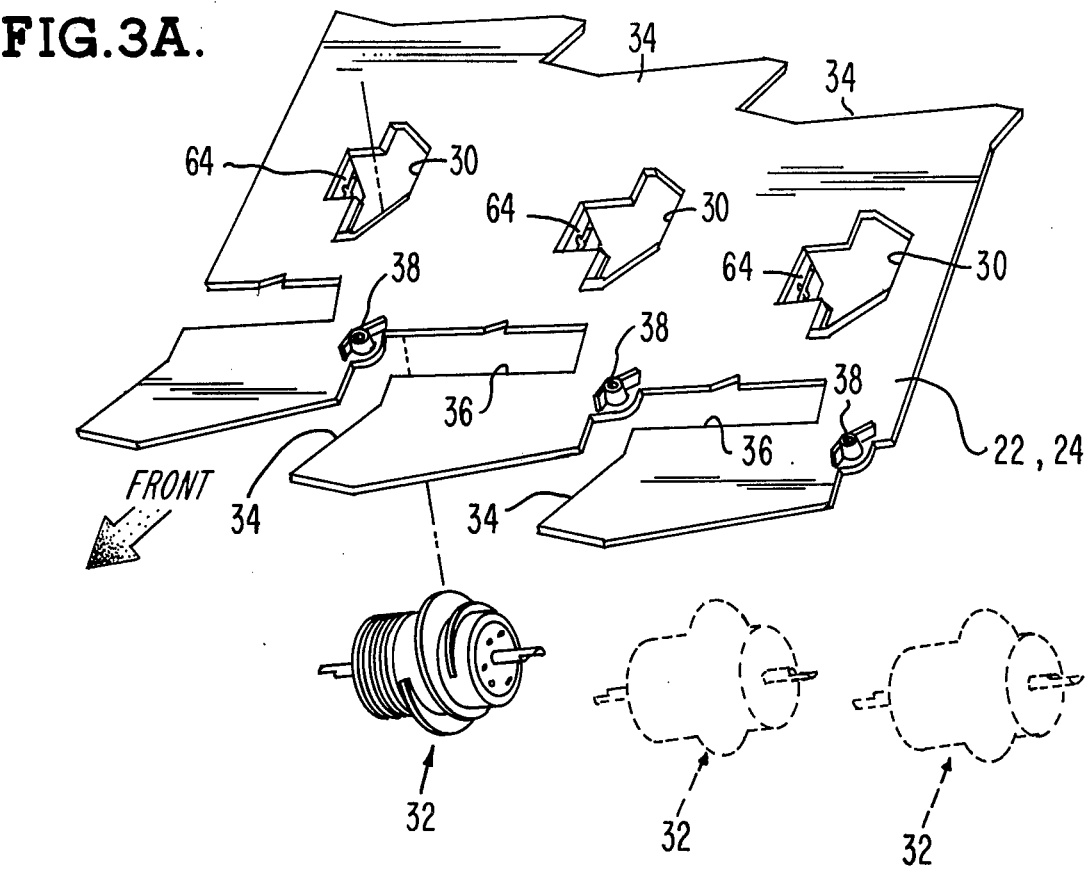
FIG. 3A is a perspective view of the front base supporting plate-like member for a three pocket modular assembly with which the auger joggers of the present invention are utilized.
Figure 4A:
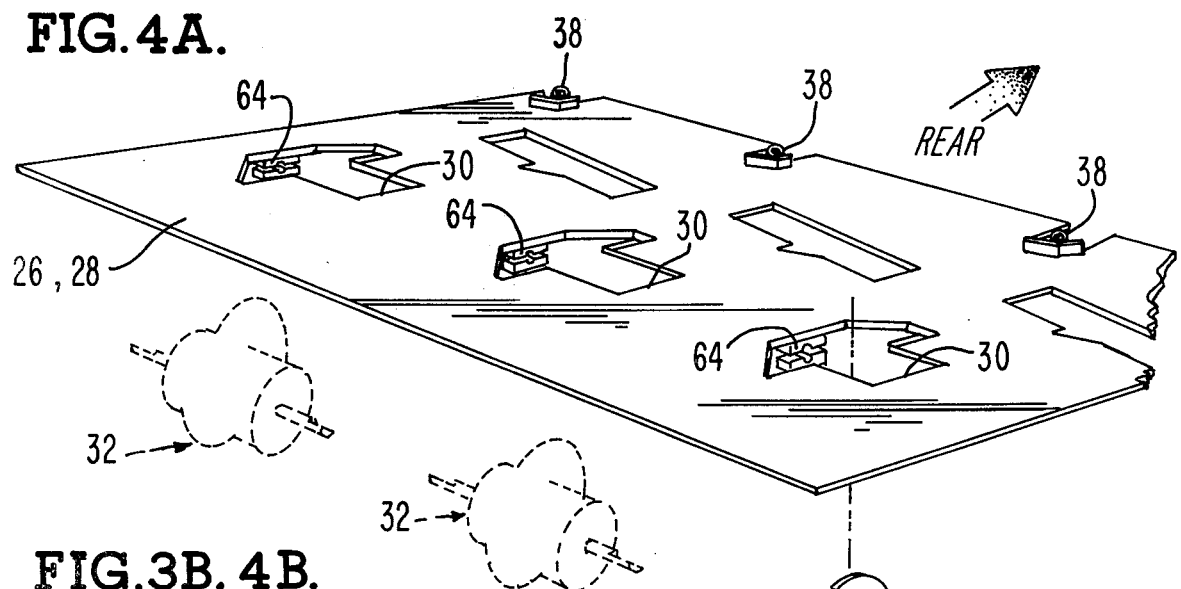
FIG. 4A is a perspective view of the rear base supporting member for the three pocket modular auger jogger assembly of the present invention.
Figures 3B, 4B:
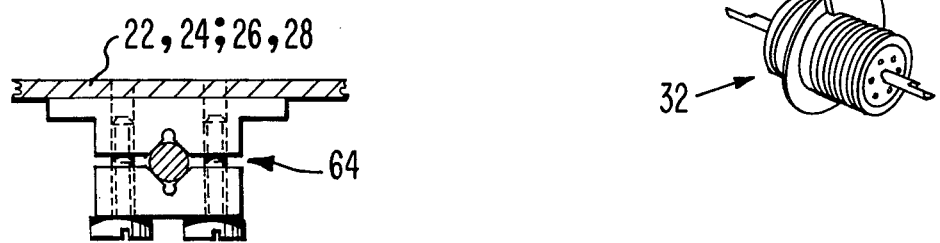
FIGS. 3B, 4B is a detail view showing the mounting of the auger jogger on the base members of FIGS. 3A and 4A.

For ease in fabrication and assembly of the present invention the base or floor of the stacker module twelve is divided into two front and two rear, flat, substantially rectangular members 22, 24, 26, and 28 respectively. The individual members, as seen in FIGS. 3A and 4A are provided with a plurality of irregularly shaped cut outs 30 for reception therethrough of an individual auger-jogger assembly 32 as will be described in detail hereinafter.

The front and rear parallel edges of the front floor members 22 and 24 are provided with irregularly shaped clearance notches 34 for interfitting engagement with the irregular shape of the upper deck of the base machine.

Three rectangular openings 36 in the front and rear floor members permit the flag assembly (not shown) to move to and fro as the pocket is filled and emptied during operation of the sorter apparatus. Reference may be had to copending U.S. application Ser. No. 953,647, assigned to the same assignee as the present invention, filed Oct. 23, 1978, in the name of William B. Templeton, entitled "Item Sorter Pocket Flag and Switch Assembly" for details of this apparatus.

Mounting pedestal 38 are provided adjacent openings 36 for attachment of individual guide arm assemblies (not shown) which effectively form the entering wall for items 14 entering each pocket receptacle. For details of this apparatus reference may be had to copending U.S. application Ser. No. 959,909, filed Nov. 13, 1978, in the name of William B. Templeton, entitled "Guide Arm Assembly" assigned to the same assignee as the present invention.

As seen most clearly in FIGS. 2 through 2D, the auger-jogger assembly 32 comprises an open ended, cylindrical member 40, a rigid, dielectric material such for example as "ZYTEL" 15IL (white). The outer periphery of member 40 is formed, as by molding, milling, casting, etc., with a first plurality of upstanding, helical lands, ridges or fins 42 originating at the rightward edge 44 of member 40 FIG. 2B and terminating leftwardly in a righthand thread, 3 per inch. Immediately adjacent land 42 are disposed a second plurality of upstanding helical lands, ridges or fins 46 originating next to the largest land of the first plurality thereof and terminating leftwardly at the left edge 48 of member 40. The first plurality of helical members 42 are coaxial with the axis of rotation 50 of member 40. The second plurality of helical members 46 as shown in FIG. 2C are eccentric 0.016 with respect to the axis of rotation 50 at member 40 for purposes to be described shortly herein.

End bells 52, FIG. 2, form closure members for the open cylindrical member 40 conveniently providing means for securing end bearings 54 disposed therein and supporting the hollow shaft 56 of eddy current motor 58. A conductive, nonmagnetic, cylindrical shell-like member 60 is secured within the open cylindrical member 40 as by cementing or adhesives against rotation therein. The wound armature of motor 58 is disposed within shell 60 with the shaft located and received on bearings 54 and with the shaft 56 fixed against rotation in yoke mount 2 FIGS. 3A, 4A, and 3B, 4B. Electrical leads 66, accessible through hollow shaft 56 are connectable to a source of energizing electrical potential (not shown).

OPERATION

At the stacker module 12 each item 14 is selectively routed either into the front or the back pocket receptacle or onto the next module, if any. Assuming that an item 14 is to enter the first front pocket 16 FIG. 1, the leading edge of the item will encounter the leading portion of the larger auger helix 42 at the helix originating edge 44.

Energization of the armature motor 58 over leads 66 from a source of electrical potential (not shown) with the armature shaft 56 immobilized in the yoke 64 against rotation, the eddy currents generated through the conductive shell 60 will cause the member 32 to rotate in the direction of the arrows FIGS. 2A and 2B.

Captivated by the lands 42, the item will be fed leftwardly FIGS. 2A and 2B on edge into the lands 46 of the second helix of the auger-jogger 32. At this point, the auger-jogger assembly is eccentric relative to the axis of rotation 50. As seen in FIG. 2C the item 14 is rapidly, intermittently bumped or jogged upwardly slightly but sufficiently away from the member 32 while at the same time the lands 46 of the assembly 32 carry the item leftwardly until it is completely out of the path of movement of the incoming items and out of the area of the jogger effectively stacked on edge within the selected pocket.

I claim:

1. In a high speed document sorter apparatus having a plurality of pockets to which documents are sorted and compacted, a document packing system comprising:
   a hollow cylindrical member, located in each pocket of a document sorter apparatus, having raised helicies of different diameters;
   means for retaining a document in a fixed position, the retaining means being positioned adjacent the hollow cylindrical member; and
   a motor within each hollow cylindrical member for rotating the hollow cylindrical member to capture documents sorted to a pocket in the raised helicies and to compact those documents in the pocket against the retaining means; the hollow cylindrical member including an eccentric cross section relative to an axis about which the hollow cylindrical member rotates for vibrating the documents captured by the raised helicies to compact the documents in the pocket against the retaining means.

2. The invention of claim 1, wherein the raised helicies comprise a capture helix and a compacting helix, the capture helix increasing in diameter from being virtually flush with the surface of the hollow cylindrical member to engage an edge of a sorted document and urge that document to the compacting helix, the compacting helix maintaining a constant radius from an axis about which the hollow cylindrical member rotates to engage and move the document for compacting in the pocket against the retaining means.

3. The invention of claim 1, wherein the motor for rotating the hollow cylindrical member comprises an electric motor housed within the hollow cylindrical member, the electric motor having a stationary armature and an electrically conductive nonmagnetic shell interposed between the electric motor and the hollow cylindrical member to rotate the hollow cylindrical member in response to energizing the electric motor.

4. The invention of claim 3, wherein the electric motor includes a hollow mounting shaft through which the electric motor is energized.

5. The invention of claim 3, wherein the electrically conductive nonmagnetic shell interposed between the electric motor and the hollow cylindrical member is secured within the hollow cylindrical member.

6. In a high speed document sorter apparatus having a plurality of pockets to which documents are sorted and compacted, a document packing system comprising:

a hollow cylindrical member, located in each pocket of a document sorter apparatus, having raised helicies of different diameters;

means for retaining a document in a fixed position, the retaining means being positioned adjacent the hollow cylindrical member; and a motor within each hollow cylindrical member for rotating the hollow cylindrical member to capture documents sorted to a pocket in the raised helicies and to compact those documents in the pocket against the retaining means; the raised helicies including a capture helix and a compacting helix, the capture helix increasing in diameter from being virtually flush with the surface of the hollow cylindrical member to engage an edge of a sorted document and urge that document to the compacting helix, the compacting helix maintaining a constant radius from an axis about which the hollow cylindrical member rotates to engage and move the document for compacting in the pocket against the retaining means.

7. The invention of claim 6, wherein the hollow cylindrical member comprises an eccentric cross section relative to an axis about which the hollow cylindrical member rotates for vibrating the documents captured by the raised helicies to compact the documents in the pocket against the retaining means.

8. The invention of claim 6, wherein the capture helix has about three threads per inch and the compacting helix has about eight threads per inch.

* * * * *

UNITED STATES PATENT AND TRADEMARK OFFICE
CERTIFICATE OF CORRECTION

PATENT NO. : 4,252,308
DATED : February 24, 1981
INVENTOR(S) : William B. Templeton It is certified that error appears in the above—identified patent and that said Letters Patent is hereby corrected as shown below:

Col. 3, Line 65 patent reads "in yoke mount 2 Figs. 3A" should be changed to "in yoke mount 64 Figs. 3A".

Col. 4, Line 10 patent reads "energization of the armature motor" should be changed to "energization of the motor 58".

Signed and Sealed this

Sixteenth Day of June 1981

[SEAL]

Attest:

RENE D. TEGTMEYER

Attesting Officer Acting Commissioner of Patents and Trademarks